United States Patent
Chikyu

(10) Patent No.: US 11,641,443 B2
(45) Date of Patent: May 2, 2023

(54) INFORMATION PROCESSING APPARATUS AND NON-TRANSITORY COMPUTER READABLE MEDIUM

(71) Applicant: FUJIFILM BUSINESS INNOVATION CORP., Tokyo (JP)

(72) Inventor: Masafumi Chikyu, Kanagawa (JP)

(73) Assignee: FUJIFILM Business Innovation Corp., Tokyo (JP)

(*) Notice: Subject to any disclaimer, the term of this patent is extended or adjusted under 35 U.S.C. 154(b) by 0 days.

(21) Appl. No.: 17/118,750

(22) Filed: Dec. 11, 2020

(65) Prior Publication Data
US 2021/0377488 A1    Dec. 2, 2021

(30) Foreign Application Priority Data
May 27, 2020   (JP) .............................. JP2020-092737

(51) Int. Cl.
*H04N 5/91*   (2006.01)
*H04N 1/00*   (2006.01)

(52) U.S. Cl.
CPC .......... *H04N 5/91* (2013.01); *H04N 1/00209* (2013.01); *H04N 1/00244* (2013.01); *H04N 1/00249* (2013.01); *H04N 2201/0093* (2013.01); *H04N 2201/0094* (2013.01)

(58) Field of Classification Search
CPC .. H04N 5/91; H04N 1/00209; H04N 1/00244; H04N 1/00249; H04N 2201/0093; H04N 2201/0094
See application file for complete search history.

(56) References Cited

U.S. PATENT DOCUMENTS

| | | | | |
|---|---|---|---|---|
| 2007/0286496 | A1* | 12/2007 | Matsuzaki | H04N 1/3876 382/209 |
| 2010/0183193 | A1* | 7/2010 | Sugisawa | G06T 3/40 382/103 |
| 2013/0031516 | A1* | 1/2013 | Sawayanagi | H04N 1/00411 715/863 |
| 2015/0146246 | A1 | 5/2015 | Ito et al. | |
| 2016/0286139 | A1* | 9/2016 | Tsuchiya | G03B 17/18 |
| 2018/0255196 | A1* | 9/2018 | Takano | H04N 1/00832 |

FOREIGN PATENT DOCUMENTS

| | | | |
|---|---|---|---|
| JP | 2015-103919 A | 6/2015 | |
| JP | 2015-171113 A | 9/2015 | |

* cited by examiner

*Primary Examiner* — Thai Q Tran
*Assistant Examiner* — Jose M Mesa
(74) *Attorney, Agent, or Firm* — Oliff PLC

(57) ABSTRACT

An information processing apparatus includes a processor configured to acquire from a storing unit a target image that is obtained by photographing a target and stored in the storing unit and a processing image that is stored in the storing unit so as to be consecutive to the target image and indicates an instruction for processing on the target image, and perform control such that the processing indicated by the processing image is performed on the target image.

20 Claims, 10 Drawing Sheets

FIG. 6

| IMAGE PATTERN ID | IMAGE PATTERN | INSTRUCTION FOR PROCESSING |
|---|---|---|
| 01 | 423a | SERVER STORAGE |
| 02 | 423b | E-MAIL TRANSMISSION |
| 03 | 423c | PDF CONVERSION |
| 04 | 423d | FAX TRANSMISSION |
| 05 | 423e | PROCESSING EXECUTION |
| xx | — | — |

| DATE AND TIME | IMAGE DATA | IMAGE PATTERN ID | CONFIRMATION FLAG |
|---|---|---|---|
| 2020-03-15 10:12:30 | ... | xx | 1 |
| 2020-03-15 10:12:35 | ... | 05 | 1 |
| 2020-03-25 09:23:46 | ... |  | 0 |
| 2020-03-25 09:23:57 | ... |  | 0 |
| ... | ... |  | 0 |
| ... | ... |  | ... |
| ... | ... |  | 0 |
| ... | ... |  | 0 |
|  |  |  |  |

| DATE AND TIME | IMAGE DATA | IMAGE PATTERN ID | CONFIRMATION FLAG |
|---|---|---|---|
| 2020-03-15 10:12:30 | ... | xx | 1 |
| 2020-03-15 10:12:35 | ... | 05 | 1 |
| 2020-03-25 09:23:46 | ... | 01 | 1 |
| 2020-03-25 09:23:57 | ... | xx | 1 |
| ... | ... | xx | 1 |
| ... | ... | ... | ... |
| ... | ... | xx | 1 |
| ... | ... | 05 | 1 |
|  |  |  |  |

INFORMATION PROCESSING APPARATUS AND NON-TRANSITORY COMPUTER READABLE MEDIUM

CROSS-REFERENCE TO RELATED APPLICATIONS

This application is based on and claims priority under 35 USC 119 from Japanese Patent Application No. 2020-092737 filed May 27, 2020.

BACKGROUND

(i) Technical Field

The present disclosure relates to an information processing apparatus and a non-transitory computer readable medium.

(ii) Related Art

An image processing apparatus that additionally records a newly photographed moving image to a previously recorded moving image without requiring a user to select a moving image to be additionally recorded every time that the user performs photographing has been suggested (see, for example, Japanese Unexamined Patent Application Publication No. 2015-171113).

The image processing apparatus described in Japanese Unexamined Patent Application Publication No. 2015-171113 includes imaging means for imaging a subject to obtain an image, generating means for generating a moving image by the imaging means, specifying means for specifying a condition for additionally recording a newly generated second moving image to a generated first moving image (for example, the same photographing date), and recording means for additionally recording the second moving image to the first moving image in a case where the second moving image meets the specified condition and a first moving image that matches the condition is present.

SUMMARY

In the case where image processing provided by an external service is performed for an image photographed with a mobile terminal or the like, an image photographed with the mobile terminal may be transmitted to the external service while the image and image processing to be performed on the image being specified. However, it is troublesome for a user to associate an image with processing to be performed on the image for every image.

Aspects of non-limiting embodiments of the present disclosure relate to providing an information processing apparatus and a non-transitory computer readable medium that are able to reduce, compared to a case where a user specifies a photographed image and image processing to be performed on the image and issues an instruction to perform the image processing, the number of operation times required for the user to issue an instruction to perform the image processing.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided an information processing apparatus including a processor configured to acquire from a storing unit a target image that is obtained by photographing a target and stored in the storing unit and a processing image that is stored in the storing unit so as to be consecutive to the target image and indicates an instruction for processing on the target image, and perform control such that the processing indicated by the processing image is performed on the target image.

BRIEF DESCRIPTION OF THE DRAWINGS

Exemplary embodiments of the present disclosure will be described in detail based on the following figures, wherein:

FIG. 6 is a diagram illustrating an example of a setting table;

FIGS. 7A and 7B are diagrams illustrating examples of a management table;

DETAILED DESCRIPTION

Figure 1:
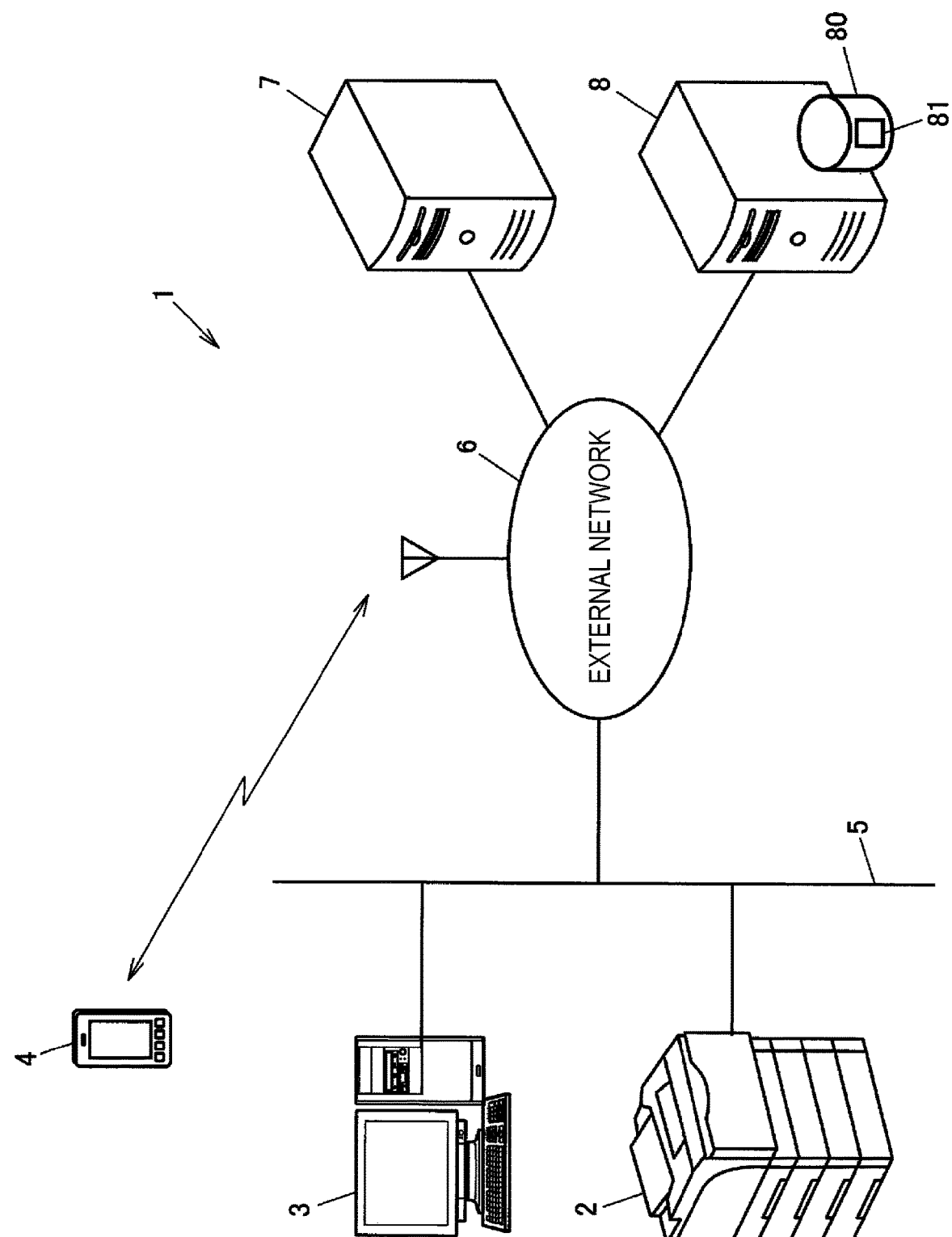
FIG. 1 is a diagram illustrating an example of the configuration of an information processing system according to an exemplary embodiment of the present disclosure.

Hereinafter, exemplary embodiments of the present disclosure will be described with reference to drawings. In the drawings, component elements having substantially the same functions are referred to with the same reference signs and redundant explanations will be omitted.

Summary of Exemplary Embodiment

An information processing apparatus according to an exemplary embodiment includes a processor configured to acquire from a storing unit a target image that is obtained by photographing a target and stored in the storing unit and a processing image that is stored in the storing unit so as to be consecutive to the target image and indicates an instruction for processing on the target image, and perform control such that the processing indicated by the processing image is performed on the target image.

The "target" may be various objects such as an object represented on paper (for example, a paper document, a photo book, or an image), an object represented on a screen (for example, a screenshot of a Web page or the like), and an object represented three-dimensionally (for example, a human being, a building, or a vehicle). In an exemplary embodiment, for example, a paper document is used as a target. "Being stored in the storing unit so as to be consecutive to the target image" represents a state in which a processing image is stored in the storing unit such that the processing image is temporally before or after the target image. For example, a case where a processing image, a target image, and a processing image are stored in the storing unit in that order, a case where a processing image and a target image are stored in the storing unit in that order, a case where a target image and a processing image are stored in the storing unit in that order, and similar cases correspond to the state mentioned above.

Exemplary Embodiment

FIG. 1 is a diagram illustrating an example of the configuration of an information processing system according to an exemplary embodiment of the present disclosure. An information processing system 1 includes an image forming apparatus 2, a personal computer (hereinafter, referred to as a PC) 3, a mobile terminal 4, an internal network 5 to which the image forming apparatus 2 and the PC 3 are connected, and an information processing server 7 and a storage server 8 that are connected to the internal network 5 via an external network 6. In FIG. 1, one PC 3 and one mobile terminal 4 are illustrated. However, two or more PCs 3 and two or more mobile terminals 4 may be provided. The information processing server 7 is an example of an information processing apparatus. The storage server 8 is an example of a storing unit.

The image forming apparatus 2 is a multifunction machine having a plurality of functions including, for example, a scan function, a print function, a copy function an electronic mail function, and a facsimile transmission and reception function.

The mobile terminal 4 is, for example, a tablet terminal, a multifunction telephone set (may be called a smartphone), or the like that has a camera function. The mobile terminal 4 communicates with the information processing server 7 and the storage server 8 via the external network 6.

The internal network 5 is, for example, a communication network such as a local area network (LAN) or a wide area network (WAN) and may be wired or wireless. The external network 6 may be a public telephone network, the Internet, or the like.

The information processing server 7 and the storage server 8 may be connected by an intranet or the like and may be configured as a physical single server. The information processing server 7 and the storage server 8 may be an example of an information processing apparatus.

The information processing server 7 provides a document processing service. In the document processing service, processing (for example, server storage, e-mail transmission, a PDF conversion, or FAX transmission) selected for an image or a document (may be called a document file) uploaded from the image forming apparatus 2, the PC 3, or the mobile terminal 4 is performed.

Figure 2:
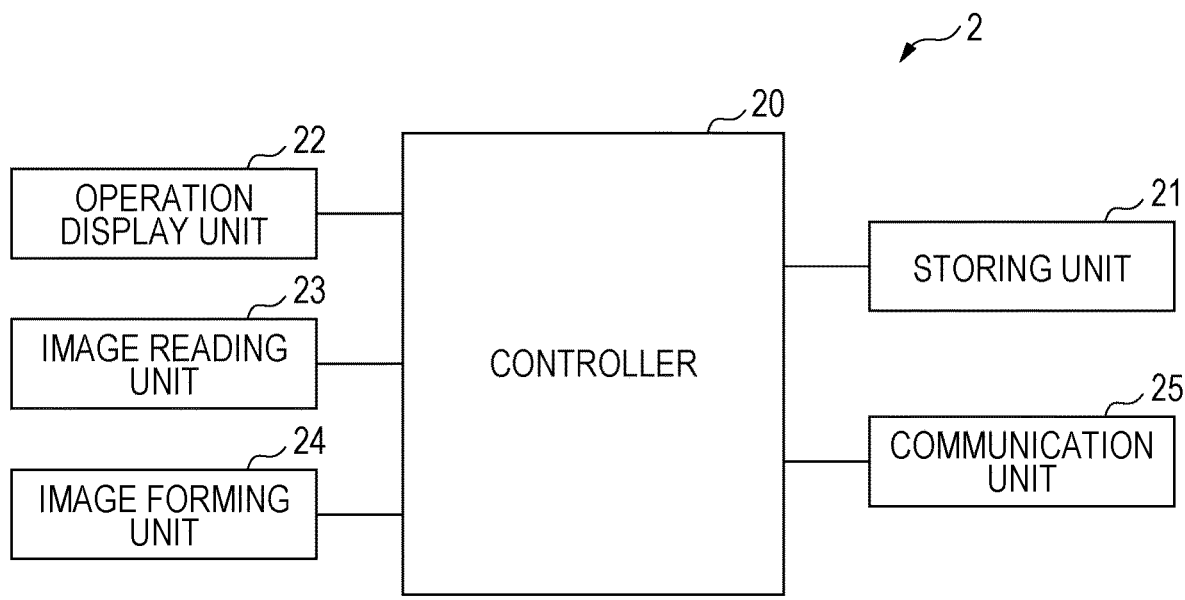
FIG. 2 is a block diagram illustrating an example of a control system of an image forming apparatus.

For use of the document processing service using the image forming apparatus 2, setting for linkage with the information processing server 7 is performed, a Web screen is displayed on an operation display unit 22 of the image forming apparatus 2 (see FIG. 2), processing is selected from a menu displayed on the Web screen, and a paper document is scanned with an image reading unit 23 (see FIG. 2). Accordingly, the document processing service is performed for the image obtained by scanning (may be called a scanned image). In the case where the paper document contains a plurality of pages, a plurality of scanned images are processed as a set of electronic files (for example, stored in a folder).

For use of the document processing service using the PC 3, setting for linkage with the information processing server 7 is performed, a Web screen is displayed on a display unit 33 of the PC 3 (see FIG. 3), and an input unit 32 (see FIG. 3) is operated such that a document file is dragged and dropped on an image indicating processing displayed on the Web screen. Accordingly, the document processing service is performed.

For use of the document processing service using the mobile terminal 4, setting for linkage with the information processing server 7 and the storage server 8 is performed, and data owned by a user is shared between the mobile terminal 4 and a service provided by the storage server 8. Accordingly, the document processing service is performed. Details of the case where the document processing service is used using the mobile terminal 4 will be described later. Furthermore, the mobile terminal 4 includes, as an operating system (OS) or application, a function for automatically or manually backing up photographs taken by the mobile terminal 4 on the storage server 8, by being linked with the storage server 8.

The storage server 8 provides a storage service that shares a file on cloud and includes a database (DB) 80 in which files for each user are able to be stored. A management table 81 (see FIGS. 7A and 7B) for each user is stored in the DB 80. For example, image data captured by the mobile terminal 4 and backed up is stored in the management table 81.

(Configuration of Image Forming Apparatus)

FIG. 2 is a block diagram illustrating an example of a control system of the image forming apparatus 2. The image forming apparatus 2 includes a controller 20 that controls units of the image forming apparatus 2. A storing unit 21, an operation display unit 22, an image reading unit 23, an image forming unit 24, and a communication unit 25 are connected to the controller 20.

The controller 20 includes a processor such as a central processing unit (CPU), an interface, and the like. The processor controls the units of the image forming apparatus 2 by executing a program stored in the storing unit 21.

The storing unit 21 includes a read only memory (ROM), a random access memory (RAM), a hard disk, and the like. A program and various types of information such as a document file are stored in the storing unit 21. The program includes a Web browser for browsing a Web page.

The operation display unit 22 receives and displays information. The operation display unit 22 is, for example, a touch panel display. The operation display unit 22 has a configuration in which a touch panel is superimposed on a display such as a liquid crystal display.

The image reading unit 23 includes an automatic paper feeder provided on a platen and a scanner that optically reads a document image from a document placed on the platen or a document transmitted from the automatic paper feeder.

The image forming unit 24 creates a printed material by forming, for example, using an electrophotographic system or an inkjet system, an image on paper fed from a paper feed cassette.

The communication unit 25 communicates with the PC 3 via the internal network 5 and communicates with an external apparatus such as the information processing server 7 and the storage server 8 via the internal network 5 and the external network 6.

(Configuration of PC)

Figure 3:
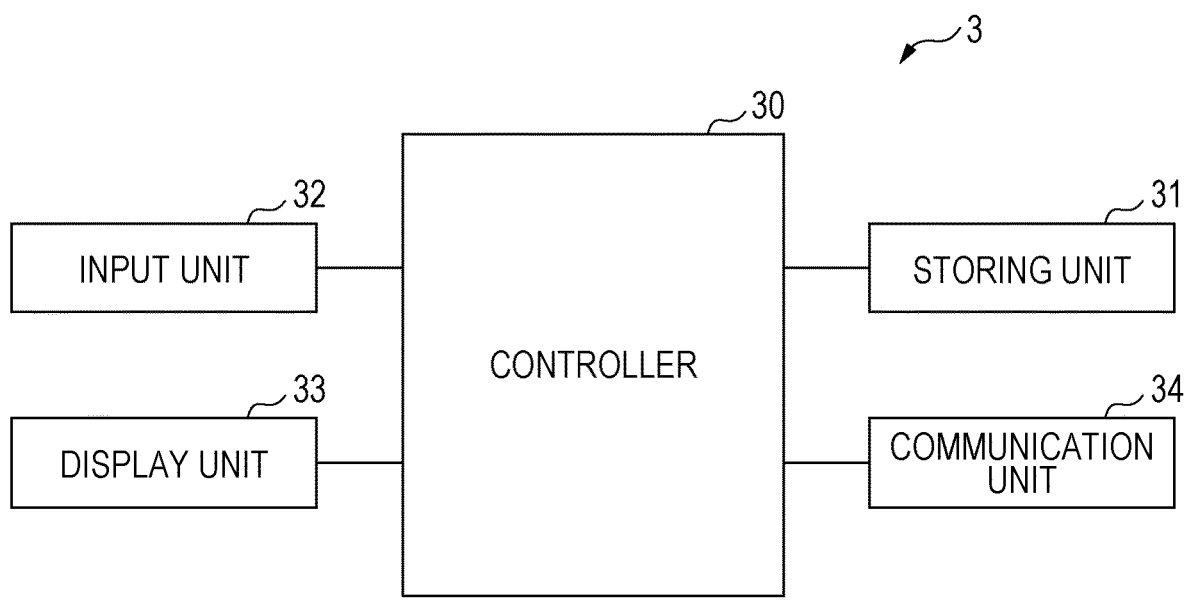
FIG. 3 is a block diagram illustrating an example of a control system of a personal computer.

FIG. 3 is a block diagram illustrating an example of a control system of the PC 3. The PC 3 includes a controller 30 that controls units of the PC 3, a storing unit 31 that stores a program including a Web blower and various types of information such as data, an input unit 32 that is implemented by a keyboard, a mouse, and the like, a display unit 33 that is implemented by a liquid crystal display or the like, and a communication unit 34 that is connected to the internal network 5.

(Configuration of Mobile Terminal)

Figure 4:
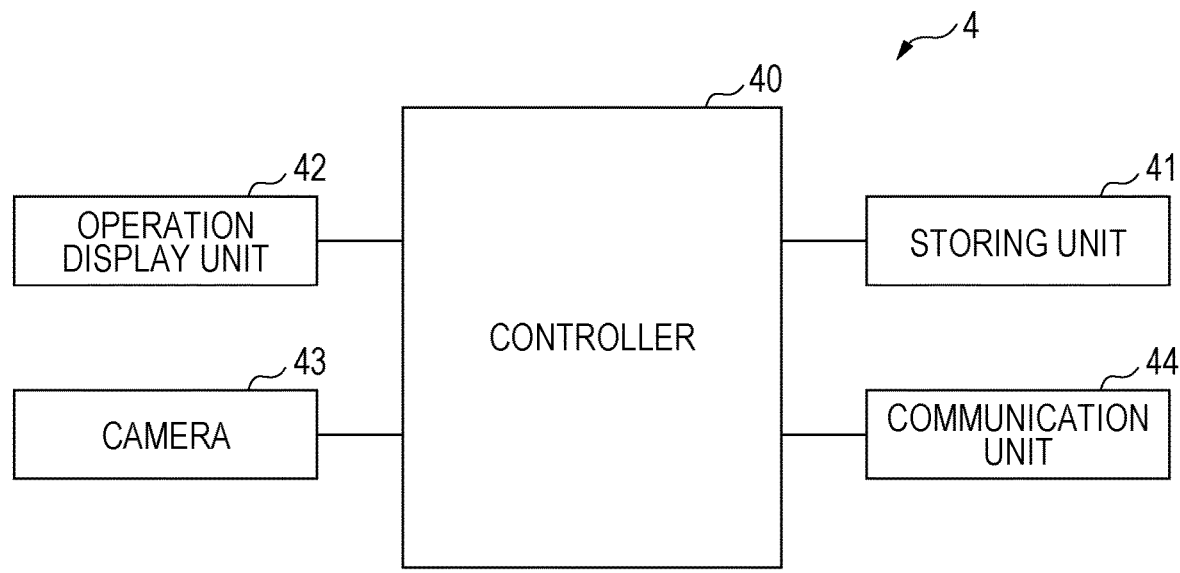
FIG. 4 is a block diagram illustrating an example of a control system of a mobile terminal.

FIG. 4 is a block diagram illustrating an example of a control system of the mobile terminal 4. The mobile terminal 4 includes a controller 40 that controls units of the mobile terminal 4, a storing unit 41 that stores a program including a Web browser and various types of information such as data, an operation display unit 42 that is implemented by a touch panel display or the like, a camera 43, and a communication unit 44 that is connected to the external network 6.

The mobile terminal 4 has a posture detection function implemented by a gravity sensor or the like. In the case where the mobile terminal 4 in a vertical position posture performs photographing using the camera 43, a vertically long photographed image (for example, vertical:horizontal=4:3) is obtained. In the case where the mobile terminal 4 in a horizontal position posture performs photographing using the camera 43, a horizontally long photographed image (for example, horizontal:vertical=4:3) is obtained.

An example of the case where the document processing service is used using the mobile terminal 4 will be described. A user takes a photograph as one of first processing images 430a to 430d (see FIGS. 9A to 9H) while covering part of a lens of the camera 43 of the mobile terminal 4 (for example, a left half, a right half, a top half, or a bottom half), and then photographs one or more paper documents as a target image(s) 431 (see FIG. 10B). After that, the user takes a photograph as a second processing image 430e (see FIGS. 9I and 9J) while covering the entire lens of the camera 43, and then uploads the corresponding one of the first processing images 430a to 430d, the target image(s) 431, and the second processing image 430e (hereinafter, these images may be referred to as "photographed images") to the storage server 8. Accordingly, the document processing service is performed.

That is, the document processing service is performed when the information processing server 7 acquires the target image(s) 431 that is/are sandwiched between the corresponding one of the first processing images 430a to 430d and the second processing image 430e from the storage server 8 and performs content of processing indicated by the corresponding one of the first processing images 430a to 430d for the target image 431. Meaning of the first processing images 430a to 430d and the second processing image 430e will be described later.

(Configuration of Information Processing Server)

Figure 5:
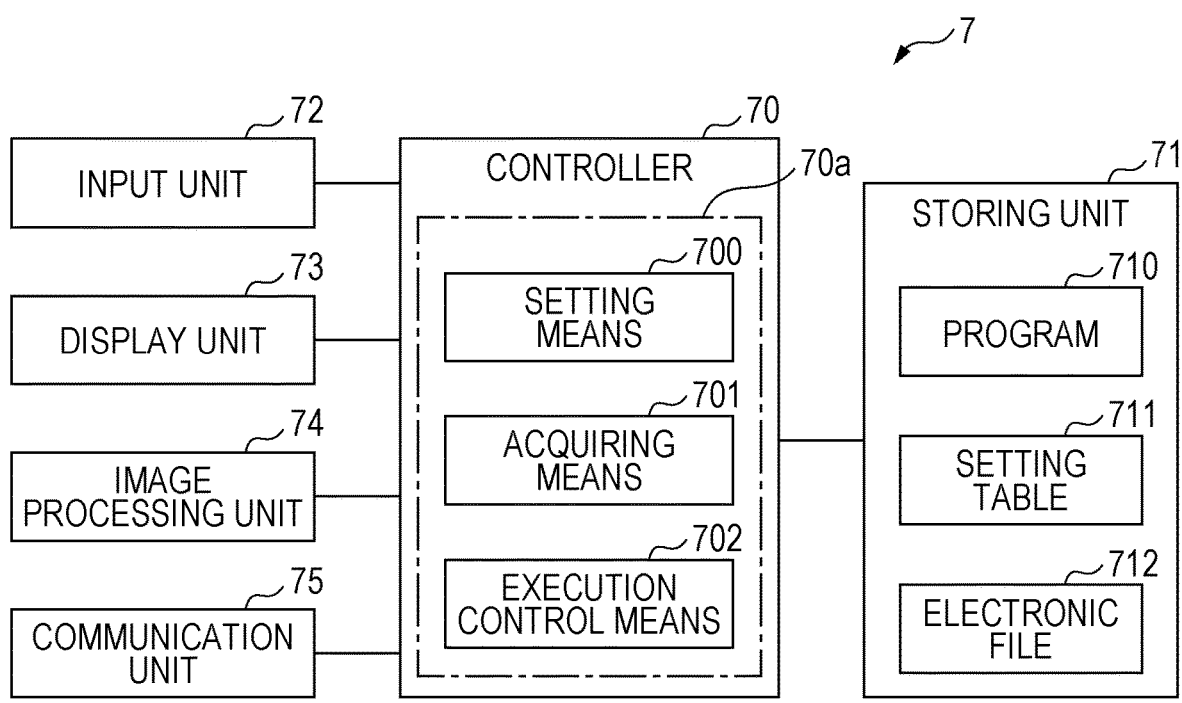
FIG. 5 is a block diagram illustrating an example of a control system of an information processing server.

FIG. 5 is a block diagram illustrating an example of a control system of the information processing server 7. The information processing server 7 includes a controller 70 that controls units of the information processing server 7, a storing unit 71 that stores a program and various types of information such as data, an input unit 72 that is implemented by a keyboard, a mouse, and the like, a display unit 73 that is implemented by a liquid crystal display or the like, an image processing unit 74 that performs image processing such as processing for converting a format of image data, and a communication unit 75 that is connected to the external network 6.

The controller 70 includes a processor 70a such as a CPU, an interface, and the like. The processor 70a functions as setting means 700, acquiring means 701, execution control means 702, and the like when executing a program 710 stored in the storing unit 71. The details of the setting means 700, the acquiring means 701, and the execution control means 702 will be described later.

The storing unit 71 includes a ROM, a RAM, a hard disk, and the like. The program 710, a setting table 711 (see FIG. 6), and various types of information such as an electronic file 712 are stored in the storing unit 71.

The image processing unit 74 performs, for example, processing for converting a photographed image or a word document in an RGB format into image data in a portable document format (PDF) format.

The communication unit 75 transmits and receives information to and from the mobile terminal 4 via the external network 6, and transmits and receives information to and from the image forming apparatus 2 and the PC 3 via the external network 6 and the internal network 5.

FIG. 6 is a diagram illustrating an example of the setting table 711. The setting table 711 contains a plurality of items such as "image pattern ID", "image pattern", and "instruction for processing". "Image pattern ID" is used for identifying an image pattern. Images captured by the mobile terminal 4 are registered as image patterns 423a to 423e in "Image pattern". An instruction for processing includes content of the processing and execution of the processing. In "instruction for processing", content of processing to be performed under control of the information processing server 7 and execution of the processing are registered. An image pattern is an example of characteristics of a processing image.

FIGS. 7A and 7B are diagrams illustrating examples of the management table 81 stored in the DB 80 of the storage server 8. The management table 81 contains a plurality of items such as "date and time", "image data", "image pattern ID", and "confirmation flag".

Dates and times when image data were uploaded to the storage server 8 (for example, year, month, date, hour, minute, and second) are recorded in "date and time" by the storage server 8 in the order in which the image data were uploaded.

Image data such as the processing images 430 and the target images 431 (hereinafter, may be referred to as "photographed images") are recorded in "image data" by the storage server 8 in the order in which the processing images 430 and the target images 431 were uploaded.

"Image pattern ID" corresponds to "image pattern ID" in FIG. 6 and is recorded by the acquiring means 701 of the information processing server 7. That is, in the case where a photographed image corresponds to any one of the image patterns illustrated in FIG. 6, a corresponding image pattern ID (01, 02, 03, 04, or 05) is recorded, and in the case where a photographed image corresponds to none of the image patterns illustrated in FIG. 6, "xx" is recorded as an image pattern ID.

A value "0" is recorded as a default value in "confirmation flag". After recording an image pattern ID in "image pattern ID", the acquiring means 701 records "1" in "confirmation flag".

Next, details of the setting means 700, the acquiring means 701, and the execution control means 702 of the controller 70 will be described.

The setting means 700 receives registration of image patterns of the first processing images 430a, 430b, 430c, and 430d and the second processing image 430e (hereinafter, may be referred to as "processing images 430" when these processing images are collectively referred to) from a user.

Specifically, the setting means 700 converts the processing images 430 uploaded to a setting screen 420 into the image patterns 423a to 423d (hereinafter, may be referred to as "image patterns 423" when these image patterns are collectively referred to) using a known pattern matching method. In the pattern matching method, for example, a plurality of image patterns with black regions of different shapes are prepared, and an image pattern with the highest similarity with a processing image 430 is selected. In the case where a photographed image has a rectangular shape, an image pattern may be a square shape or a rectangular shape corresponding to the shape of the photographed image. The pattern matching method is not necessarily used. Conversion into an image pattern may not be performed. For example, characteristics of an image registered in advance by a user and content of processing may be stored in association with each other. In the case where the similarity between characteristics of a processing image and the characteristics of the image registered in advance is equal to or more than a threshold, the processing image is determined to correspond to the image registered in advance.

Furthermore, the setting means 700 records content of processing associated with a converted image pattern 423 into the setting table 711. For example, content of a plurality of pieces of processing is prepared in advance, and a user may select content of processing to be associated with the image pattern 423.

The acquiring means 701 acquires from the storage server 8 the target image 431 obtained by photographing a target and stored in the storage server 8 and the processing images 430 stored in the storage server 8 so as to be consecutive to the target image 431 and indicating an instruction for processing on the target image 431. Specifically, for example, the acquiring means 701 acquires a target image 431 between an unconfirmed first processing image 430a with an image pattern ID of 01 and an unconfirmed second processing image 430e with an image pattern ID of 05 from the management table 81 of the storage server 8, and stores the acquired target image 431 as the electronic file 712 into the storing unit 71.

The first processing image 430a may indicate a starting position of processing, and the second processing image 430e may indicate an ending position of the processing. The first processing image 430a may indicate content of processing, and the second processing image 430e may indicate an instruction for execution of the processing. Furthermore, the first processing image 430a may indicate a starting position of processing and content of the processing, and the second processing image 430e may indicate an ending position of the processing and an instruction for execution of the processing.

The first processing image 430a may not indicate content of processing, and the second processing image 430e may indicate the content of the processing and execution of the processing. Furthermore, in the case where an interval between photographing times of target images 431 is equal to or longer than a predetermined time (for example, one minute), only target images 431 captured before the interval that is equal to or longer than the predetermined time may be acquired as targets for processing. In this case, the last target image 431 as a target for processing may also serve as the second processing image 430e.

In the case where no processing image 430 is acquired, the acquiring means 701 may perform control such that a warning that prompts the user to add a processing image 430 is provided.

The execution control means 702 controls the units of the information processing server 7 and the storage server 8 to perform processing indicated by the first processing images 430a to 430d for the target image 431 in accordance with an instruction for executing the processing indicated by the second processing image 430e.

Specifically, the execution control means 702 performs control such that content of processing corresponding to an image pattern ID of one of the first processing images 430a to 430d determined by the acquiring means 701, with reference to the setting table 711 in FIG. 6, is performed for the target image 431 stored in the storing unit 71.

That is, in the case where the image pattern ID is 01 and an instruction for processing is server storage, the execution control means 702 controls a server, for example, the DB 80 of the storage server 8, to store the target image 431. In the case where the image pattern ID is 02 and an instruction for processing is e-mail transmission, the execution control means 702 controls the communication unit 75 to transmit the target image 431 to a terminal with a specified e-mail address (for example, the PC 3). In the case where the image pattern ID is 03 and an instruction for processing is PDF conversion, the execution control means 702 controls the image processing unit 74 to convert the target image 431 into the PDF format. In the case where the image pattern ID is 04 and an instruction for processing is FAX transmission, the execution control means 702 controls the communication unit 75 to transmit the target image 431 to a transmission destination with a specified FAX number.

Because the first processing images 430a to 430d are stored prior to target images 431 into the storage server 8, the execution control means 702 may start processing corresponding to the first processing images 430a to 430d for target images 431 sequentially, instead of waiting until all the target images 431 have been acquired and then performing processing.

(Operation of Information Processing System)

Next, an example of an operation of the information processing system 1 will be described with reference to FIGS. 8 to 12. FIG. 12 is a flowchart illustrating an example of an operation of the information processing server 7.

(1) Setting of Image Pattern

A user operates the mobile terminal 4 to access the information processing server 7. The setting means 700 of the information processing server 7 transmits information of a setting screen using a Web page to the mobile terminal 4. The controller 40 of the mobile terminal 4 causes the setting screen to be displayed on the operation display unit 42.

Figure 8:
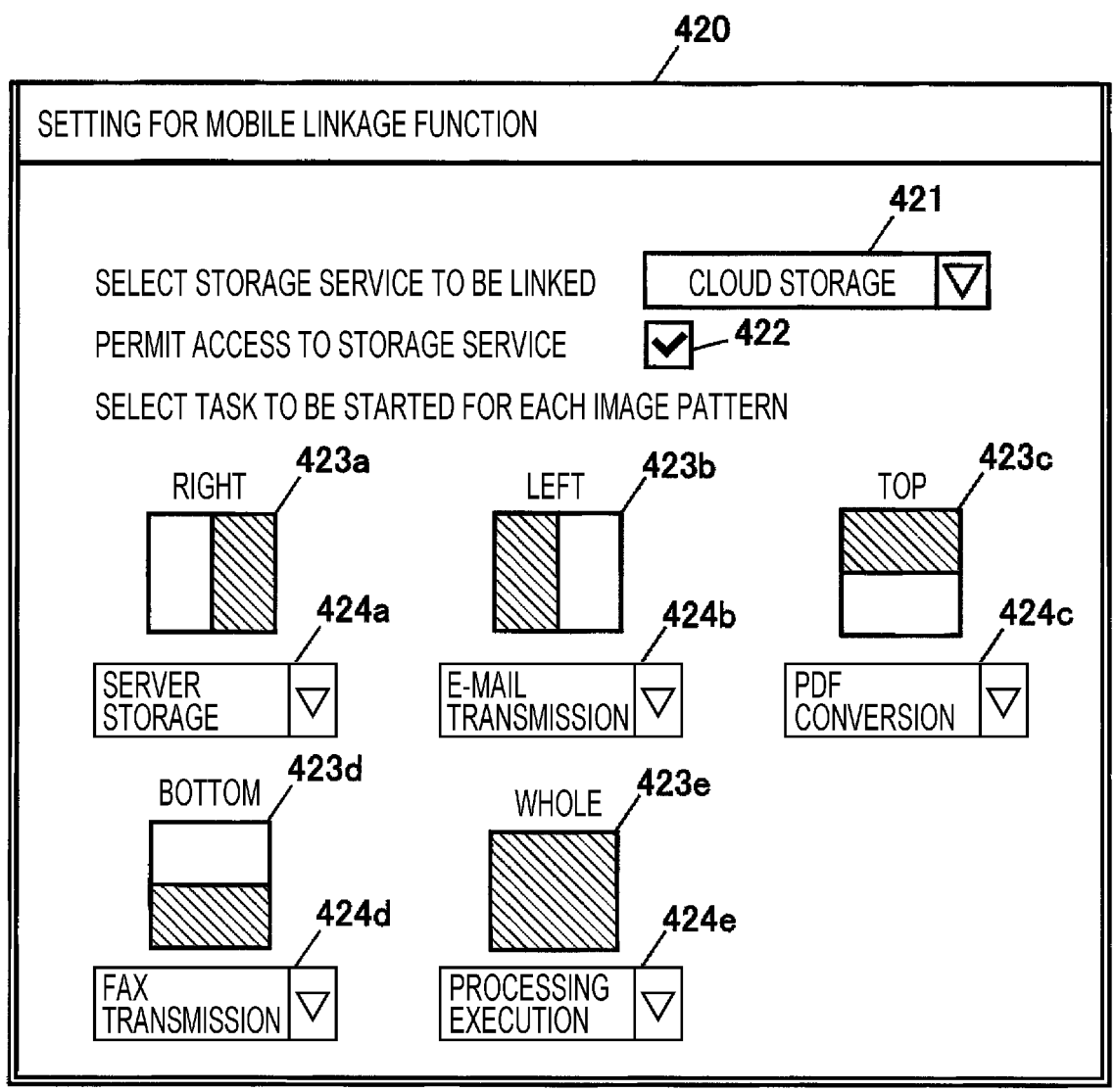
FIG. 8 is a diagram illustrating an example of a setting screen.

FIG. 8 is a diagram illustrating an example of a setting screen. In FIG. 8, a state after setting is completed is illustrated. The setting screen 420 contains a storage selecting unit 421 for selecting a storage service to be linked with the mobile terminal 4, a check box 422 for selecting whether or not to allow access to the storage server 8, and processing content input fields 424a to 424e (hereinafter, may be referred to as "processing content input fields 424" in the case where the processing content input fields 424a to 424e are collectively referred to) into which content of processing and execution of the processing are input for the image patterns 423a to 423e. Content of processing and execution of the processing are input to the processing content input fields 424 by performing selection using a pull-down menu.

In the example illustrated in FIG. 8, a case where "server storage" is input to the processing content input field 424*a* for the image pattern 423*a* whose right part is black, "e-mail transmission" is input to the processing content input field 424*b* for the image pattern 423*b* whose left part is black, "PDF conversion" is input to the processing content input field 424*c* for the image pattern 423*c* whose top part is black, "FAX transmission" is input to the processing content input field 424*d* for the image pattern 423*d* whose bottom part is black, and "processing execution" is input to the processing content input field 424*e* for the image pattern 423*e* with the entire black region is illustrated.

An instruction for processing will now be explained. "Server storage" represents, as content of processing, processing for storing a photographed image into a server specified on a details setting screen (for example, the storage server 8). "E-mail transmission" represents, as content of processing, processing for transmitting a photographed image to an e-mail address specified on the details setting screen. "PDF conversion" represents, as content of processing, processing for converting a photographed image into the PDF format. "FAX transmission" represents, as content of processing, processing for transmitting, by facsimile, a photographed image to a transmission destination specified on the details setting screen. "Processing execution" represents execution of processing. Specifically, "processing execution" represents execution of processing such as server storage, e-mail transmission, PDF conversion, and FAX transmission. Processing is not limited to the processing mentioned above. Processing typically performed for an image, such as rotation of an image, inversion of an image, color adjustment (color interpolation processing, color correction, etc.) of an image, resolution adjustment, and contour enhancement processing, may also be included.

Figure 9A:
FIGS. 9A to 9J are diagrams illustrating examples of photographing methods using a mobile terminal.
Figure 9B:
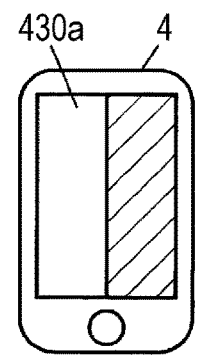
Figure 9C:
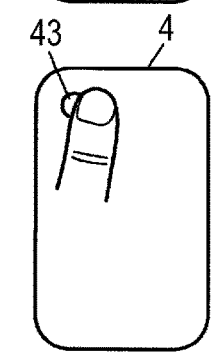
Figure 9D:
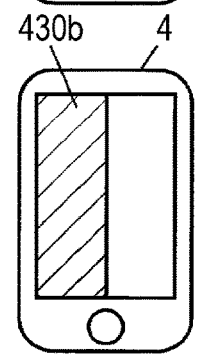
Figure 9E:
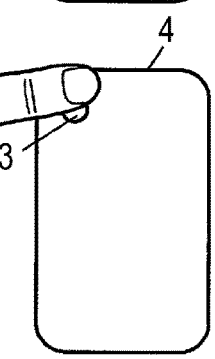
Figure 9F:
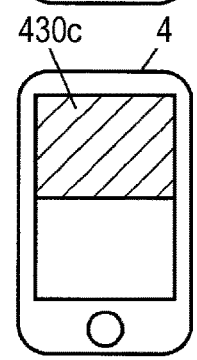
Figure 9G:
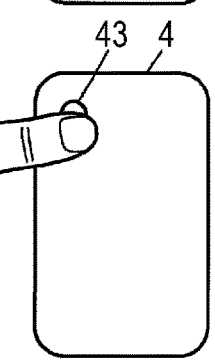
Figure 9H:
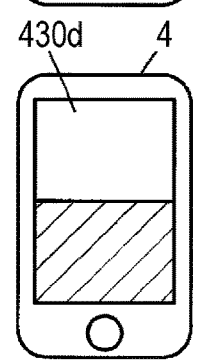
Figure 9I:
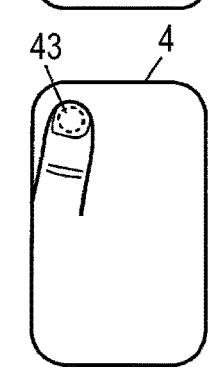
Figure 9J:
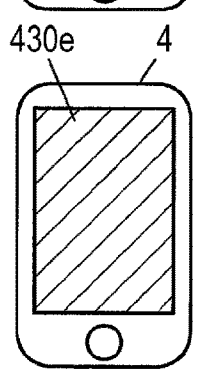

When photographing is performed while a left part of the lens of the camera 43 of the mobile terminal 4 being covered as illustrated in FIG. 9A, the first processing image 430*a* illustrated in FIG. 9B is obtained. When photographing is performed while a right part of the lens of the camera 43 of the mobile terminal 4 being covered as illustrated in FIG. 9C, the first processing image 430*b* illustrated in FIG. 9D is obtained. When photographing is performed while a top part of the lens of the camera 43 of the mobile terminal 4 being covered as illustrated in FIG. 9E, the first processing image 430*c* illustrated in FIG. 9F is obtained. When photographing is performed while a bottom part of the lens of the camera 43 of the mobile terminal 4 being covered as illustrated in FIG. 9G, the first processing image 430*d* illustrated in FIG. 9H is obtained. When photographing is performed while the entire lens of the camera 43 of the mobile terminal 4 being covered as illustrated in FIG. 9I, the second processing image 430*e* illustrated in FIG. 9J is obtained. Accordingly, when the user performs photographing sequentially, for example, while the left part, the right part, the top part, the bottom part, and the entire lens of the camera 43 being covered, the first processing images 430*a* to 430*d* and the second processing image 430*e* are stored in the storing unit 41. The controller 40 of the mobile terminal 4 transmits a plurality of (for example, five) processing images 430 stored in the storing unit 41 to the information processing server 7 via the external network 6.

The setting means 700 of the information processing server 7 converts the uploaded processing images 430 into the image patterns 423.

The setting means 700 sequentially arranges the image patterns 423*a* to 423*d* in a photographed order on the setting screen 420. The user operates the processing content input fields 424 to select content of processing and execution of the processing using the pull-down menu. "Server storage", "e-mail transmission", "PDF conversion", and "FAX transmission" are prepared in advance as the content of processing.

When instructions for the processing (the content of the processing and execution of the processing) are selected for the image patterns 423*a* to 423*e* as described above, the setting means 700 provides the image patterns with image pattern IDs and registers the image pattern IDs along with the instructions for the processing into the setting table 711, as illustrated in FIG. 6.

The first processing images 430*a* to 430*d* in FIGS. 9B, 9D, 9F, and 9H correspond to the image pattern IDs 01 to 04 and the image patterns 423*a* to 423*d* in FIG. 6. The second processing image 430*e* in FIG. 9J corresponds to the image pattern ID xx and the image pattern 423*e* in FIG. 6.

(2) Uploading of Image Obtained by Photographing Paper Document

Next, a case where an image obtained by photographing a paper document by a user using the mobile terminal 4 is uploaded to the storage server 8 will be explained. A case where "server storage" is selected as content of processing will be explained.

Figure 10A:
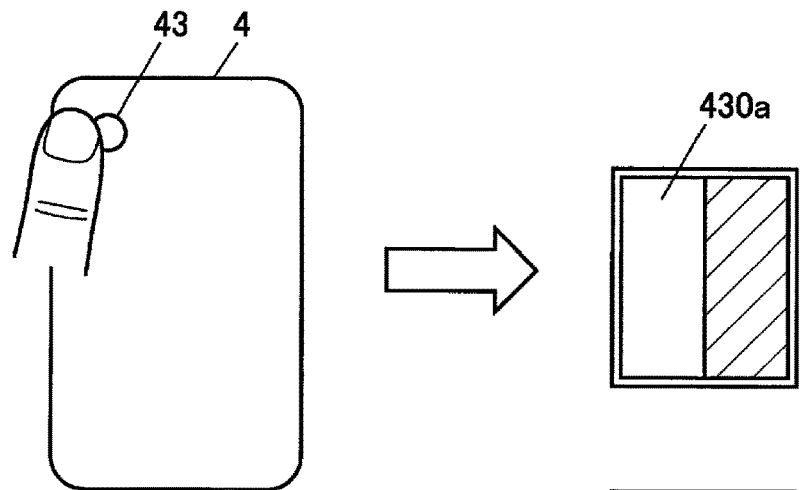
FIGS. 10A to 10C are diagrams illustrating examples of photographing methods using a mobile terminal.
Figure 10B:
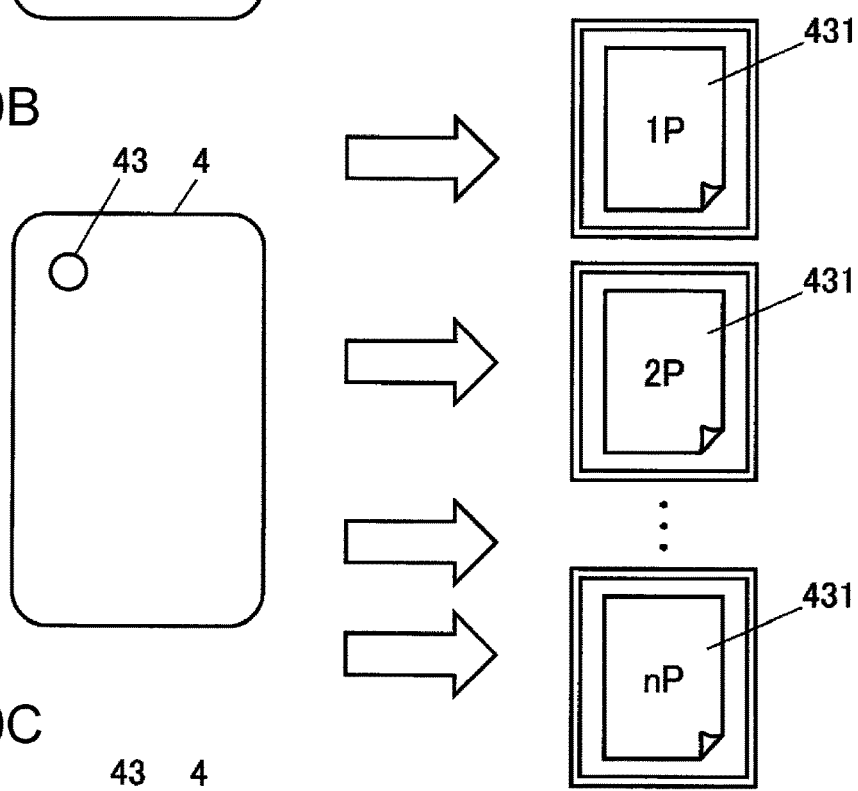
Figure 10C:
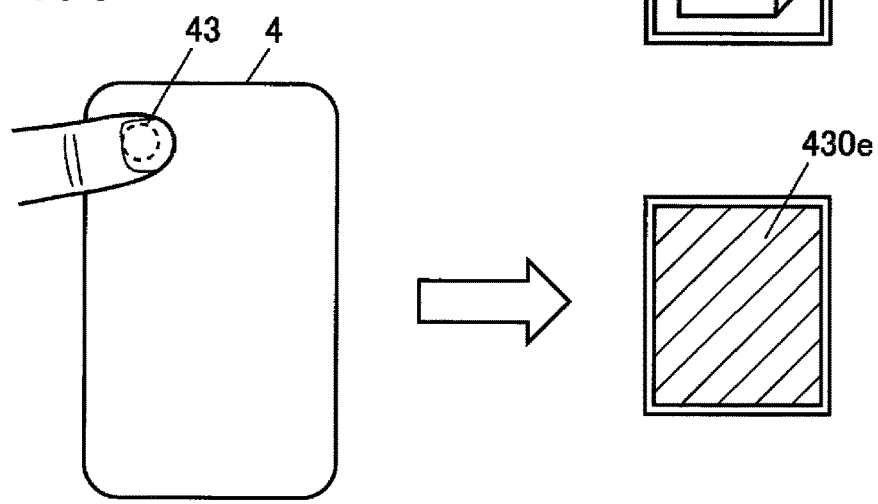

FIGS. 10A to 10C are diagrams for explaining examples of methods for uploading images obtained by photographing using the mobile terminal 4. First, a user performs photographing while covering a left part of the lens of the camera 43, and obtains the first processing image 430*a*, as illustrated in FIG. 10A. The controller 40 of the mobile terminal 4 causes the obtained first processing image 430*a* to be stored into the storing unit 41, and uploads the first processing image 430*a* to the storage server 8, which is linked with the mobile terminal 4, via the external network 6.

Next, the user performs photographing while directing the camera 43 of the mobile terminal 4 toward a paper document that is desired to be converted into an electronic file. For example, n images are captured in the page order. The controller 40 of the mobile terminal 4 causes the obtained n target images 431 to be sequentially stored into the storing unit 41, and sequentially uploads the n target images 431 to the storage server 8.

Finally, the user performs photographing while covering the entire lens of the camera 43 to obtain the second processing image 430*e*. The controller 40 of the mobile terminal 4 causes the obtained second processing image 430*e* to be stored into the storing unit 41, and uploads the second processing image 430*e* to the storage server 8.

In the case where an operation for uploading is performed, the controller 40 of the mobile terminal 4 may upload the first processing image 430*a*, the target image 431, and the second processing image 430*e* stored in the storing unit 41 to the storage server 8. The controller 40 of the mobile terminal 4 may upload the first processing image 430*a*, the target image 431, and the second processing image 430*e* to the storage server 8 without causing them to be stored in the storing unit 41.

The storage server 8 records the first processing image 430*a*, the target image 431, and the second processing image 430*e* uploaded from the mobile terminal 4, along with uploaded date and time, into the management table 81, as illustrated in FIG. 7A. In FIG. 7A, "1" is recorded in "confirmation flag" in the first and second rows. This indicates that confirmation by the acquiring means 701 is completed for the first and second rows.

(3) Processing for Uploaded Images

Processing for uploaded images will be explained with reference to a flowchart of FIG. 12.

The acquiring means 701 of the information processing server 7 extracts added image data from the storage server 8 in chronological order (S1). That is, the acquiring means 701 sequentially extracts image data with the confirmation flag "0" in the order from the latest to the oldest from the management table 81 of the storage server 8.

The acquiring means 701 determines whether or not there is any unconfirmed image (S2). In the case where image data with the confirmation flag "0" in the management table 81 is recorded, it is determined that there is an unconfirmed image. In the case illustrated in FIG. 7A, image data with the uploaded date and time "2020-03-25 09:23:46" and image data updated at later times have not been confirmed.

In the case where there is unconfirmed image data (S2: Yes), the acquiring means 701 determines whether or not the unconfirmed image data corresponds to one of the first processing images 430a to 430d (S3). That is, the acquiring means 701 determines, using a pattern matching method similar to that used by the setting means 700, whether or not the unconfirmed image data corresponds to one of the image patterns with the image pattern IDs 01 to 04 illustrated in FIG. 6.

In the case where it is determined that the unconfirmed image data corresponds to one of the first processing images 430a to 430d (S3: Yes), the acquiring means 701 records "01" as "image pattern ID" and records "1" as "confirmation flag", as illustrated in FIG. 7B.

The acquiring means 701 determines whether or not the next image data is unconfirmed image data (S4). In the case where image data with the confirmation flag "0" in the management table 81 is recorded, the image data is determined to be unconfirmed image data.

In the case where the next image data is unconfirmed image data (S4: Yes), the acquiring means 701 determines whether or not an image corresponding to the image data is the second processing image 430e (S5). That is, the acquiring means 701 determines, using the pattern matching method similar to that used by the setting means 700, whether or not the unconfirmed image data corresponds to the image pattern with the image pattern ID 05 illustrated in FIG. 6.

In the case where the image corresponding to the unconfirmed image data is not the second processing image 430e (S5: No), the acquiring means 701 repeats the processing (S6) for determining whether or not the next image data is unconfirmed image data and the processing (S7) for determining whether or not the image corresponding to the unconfirmed image data is the second processing image 430e until it is determined that the unconfirmed image is the second processing image 430e.

In the case where it is determined that the unconfirmed image is the second processing image 430e (S7: Yes), the acquiring means 701 acquires, as the target image 431, image data between one of the first processing images 430a to 430d (in FIG. 11, the first processing image 430a) and the second processing image 430e, and causes the target image 431 to be stored into the storing unit 71 of the information processing server 7, as illustrated in FIG. 11 (S8).

Figure 11:
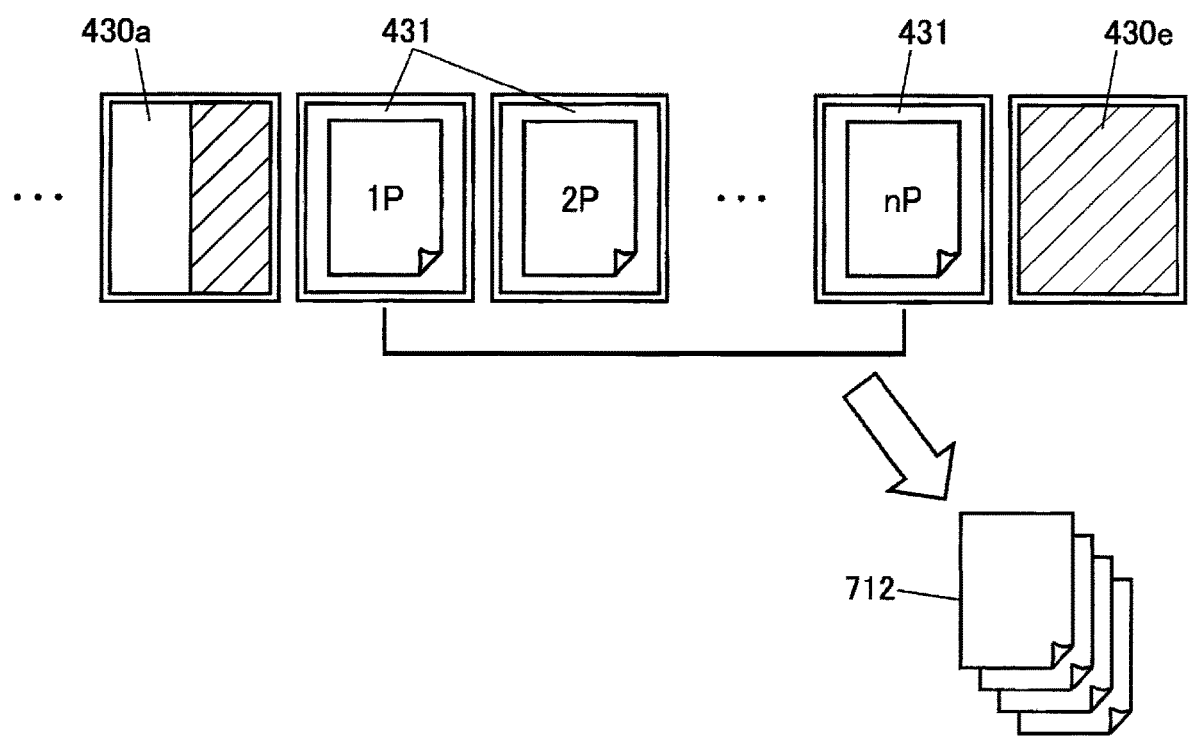
FIG. 11 is a diagram illustrating an example of processing on a photographed image uploaded to a storage server.
Figure 12:
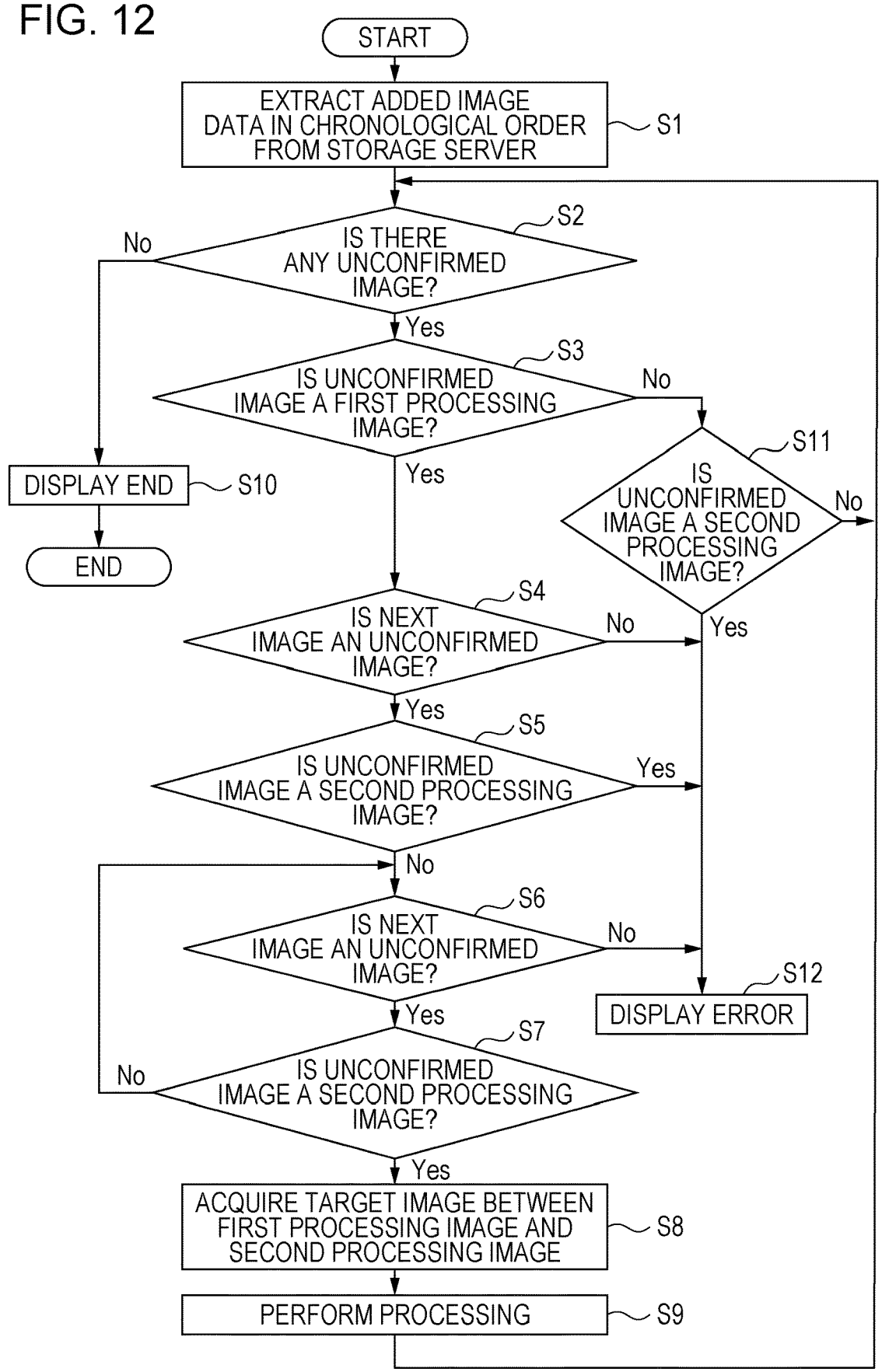
FIG. 12 is a flowchart illustrating an example of an operation of an information processing server.

The execution control means 702 performs control such that content of processing corresponding to the image pattern ID of one of the first processing images 430a to 430d determined in step S3 is performed for the target image 431 stored in the storing unit 71, as illustrated in FIG. 11 (S9). In the case illustrated in FIG. 11, the execution control means 702 controls the communication unit 75 to cause the target images 431 to be stored as a set of electronic files into the storage server 8.

In the case where it is determined in step S2 that there is no unconfirmed image (S2: No), the acquiring means 701 controls the mobile terminal 4 to display a notification indicating that the process has ended (S10).

In the case where it is determined in step S3 that the unconfirmed image is none of the first processing images 430a to 430d (S3: No), the acquiring means 701 determines whether or not the unconfirmed image is the second processing image 430e (S11).

In the case where it is determined in step S4 that the next image is not an unconfirmed image (S4: No), in the case where it is determined in step S5 that the next image is the second processing image 430e (S5: Yes), in the case where it is determined in step S6 that the next image is not an unconfirmed image (S6: No), or it is determined in step S11 that the unconfirmed image is the second processing image 430e (S11: Yes), the acquiring means 701 controls the mobile terminal 4 to provide error display (S12). As error display, display corresponding to content of error, for example, in the case where the target image 431, the first processing images 430a to 430d, or the second processing image 430e is missing, a warning that prompts the user to add the missing image, is provided. Error display is an example of a warning. In the case where the first processing images 430a to 430d are missing, the user may be simply asked about the content of the processing. For example, a user interface (UI) screen indicating "Please select processing you wish to perform for the target images." as well as thumbnail images for the acquired target images 431 may be displayed. Thus, the acquiring means 701 may receive the content of the processing.

With the configuration described above, there is no need to perform an operation for displaying a menu for processing for the target images 431. Thus, compared to a configuration that requires displaying of a menu for processing, the number of operation times may be reduced.

First Modification

In the exemplary embodiment described above, the first processing images 430a to 430d and the second processing image 430e are captured before and after the target image 431 is captured and are uploaded to the storage server 8. However, the processing images 430 may be captured in advance and may be stored as the image patterns 423a to 423e into the storing unit 41 of the mobile terminal 4. After selecting the image patterns 423a to 423d corresponding to the first processing images 430a to 430d, a user may capture the target images 431 and then select the image pattern 423e corresponding to the second processing image 430e. In this case, the controller 40 of the mobile terminal 4 uploads the image pattern IDs and the target image 431 to the storage server 8, instead of transmitting the processing images 430.

Second Modification

In the exemplary embodiment described above, the processing images 430 are identified according to image pattern. However, the processing images 430 may be identified according to color or combination of image pattern and color. Color or a combination of color and image pattern is an example of characteristics of a processing image.

Third Modification

In the exemplary embodiment described above, after one of the first processing images 430a to 430d is captured, the target image 431 is captured. However, two or more of the first processing images 430a to 430d are captured in a consecutive manner, the target image 431 may be captured.

In this case, the execution control means 702 of the information processing server 7 performs control such that content of processing indicated by the consecutive two or more of first processing images 430a to 430d is performed for the target image 431 in a consecutive manner.

For example, after the first processing image 430c with the content of processing "PDF conversion" (the image pattern ID is "03") is captured, the first processing image 430b with the content of processing "e-mail transmission" (the image pattern ID is "02") is captured. Subsequently, the target image 431 is captured, and the second processing image 430e is captured. Then, the first processing image 430c, the first processing image 430b, the target image 431, and the second processing image 430e are uploaded to the storage server 8. In this case, the target image 431 is converted into the PDF format and transmitted to a specified e-mail address by the information processing server 7.

Fourth Modification

A separation image for separating between target images 431 may be inserted between the target images 431. For example, the first processing images 430a to 430d, a target image 431, a target image 431, . . . , a separation image, a target image 431, a target image 431, . . . , and the second processing image 430e may be captured in that order and uploaded to the storage server 8.

In this case, the execution control means 702 performs control such that processing indicated by the first processing images 430a to 430d is performed for individual target image sets separated by a separation image. Each processed target image set separated by a separation image is stored as a set of electronic files (for example, stored into a folder).

Fifth Modification

The information processing server 7 and the storage server 8 may be provided in the internal network 5. In this case, the mobile terminal 4 communicates with the information processing server 7 and the storage server 8 via the internal network 5 in a wireless manner.

Exemplary embodiments of the present disclosure have been described above. However, the exemplary embodiments of the present disclosure are not limited to the exemplary embodiments described above and various modifications and implementations may be made to the present disclosure.

The means of a processor may be partially or entirely configured as a hardware circuit such as a field programmable gate array (FPGA) or an application specific integrated circuit (ASIC).

Furthermore, part of components in the exemplary embodiments described above may be omitted or changed. In the flow of a process in the exemplary embodiments described above, addition, deletion, change, exchange, and the like of steps may be performed. A program used in the exemplary embodiments described above may be recorded in a computer-readable recording medium such as a compact disc-read only memory (CD-ROM) and provided. The program may be stored in an external server such as a cloud server and used via a network.

In the embodiments above, the term "processor" refers to hardware in a broad sense. Examples of the processor include general processors (e.g., CPU: Central Processing Unit) and dedicated processors (e.g., GPU: Graphics Processing Unit, ASIC: Application Specific Integrated Circuit, FPGA: Field Programmable Gate Array, and programmable logic device).

In the embodiments above, the term "processor" is broad enough to encompass one processor or plural processors in collaboration which are located physically apart from each other but may work cooperatively. The order of operations of the processor is not limited to one described in the embodiments above, and may be changed.

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. An information processing apparatus comprising:
a processor configured to
  acquire a target image and a processing image from a memory, wherein
    the target image and the processing image are separate images stored consecutively to one another in the memory without another image intervening between the target image and the processing image in the memory,
    the target image is obtained by photographing a target, and
    the processing image includes a pattern recognizable by the processor as an instruction for processing to be performed on the target image and the pattern is present when the processor acquires the processing image from the memory, and
  perform the processing on the target image as a result of acquiring the processing image from the memory and recognizing the pattern as the instruction, and without additional input.

2. The information processing apparatus according to claim 1, wherein the processing image includes a first processing image indicating a starting position of the processing and a second processing image indicating an ending position of the processing.

3. The information processing apparatus according to claim 2, wherein the first processing image is stored prior to the target image into the memory.

4. The information processing apparatus according to claim 1, wherein the processing image includes a first processing image indicating content of the processing and a second processing image indicating an instruction for execution of the processing on the target image.

5. The information processing apparatus according to claim 2, wherein the processing image includes a first processing image indicating content of the processing and a second processing image indicating an instruction for execution of the processing on the target image.

6. The information processing apparatus according to claim 4, wherein the processor is configured to, in a case where a plurality of first processing images are acquired in a consecutive manner, perform control such that the content of the processing indicated by the acquired first processing images is performed on the target image in a consecutive manner.

7. The information processing apparatus according to claim 5, wherein the processor is configured to, in a case where a plurality of first processing images are acquired in a consecutive manner, perform control such that the content of the processing indicated by the acquired first processing images is performed on the target image in a consecutive manner.

8. The information processing apparatus according to claim 1, wherein the processing image is selected from a photographed image or information registered in advance.

9. The information processing apparatus according to claim 2, wherein the processing image is selected from a photographed image or information registered in advance.

10. The information processing apparatus according to claim 3, wherein the processing image is selected from a photographed image or information registered in advance.

11. The information processing apparatus according to claim 4, wherein the processing image is selected from a photographed image or information registered in advance.

12. The information processing apparatus according to claim 5, wherein the processing image is selected from a photographed image or information registered in advance.

13. The information processing apparatus according to claim 6, wherein the processing image is selected from a photographed image or information registered in advance.

14. The information processing apparatus according to claim 7, wherein the processing image is selected from a photographed image or information registered in advance.

15. The information processing apparatus according to claim 1, wherein in a case where an interval between photographing times of target images is equal to or longer than a predetermined time, only target images captured before the interval that is equal to or longer than the predetermined time are used as targets for the processing.

16. The information processing apparatus according to claim 2, wherein in a case where an interval between photographing times of target images is equal to or longer than a predetermined time, only target images captured before the interval that is equal to or longer than the predetermined time are used as targets for the processing.

17. The information processing apparatus according to claim 1, wherein the processor is configured to, in a case where no processing image is acquired, perform control such that a warning is displayed.

18. The information processing apparatus according to claim 1, wherein the processor is configured to receive registration of characteristics of the processing image from a user.

19. The information processing apparatus according to claim 1, wherein the processor is configured to acquire a separation image for separating between target images from the memory and perform control such that the processing is performed for individual target image sets separated by the separation image.

20. A non-transitory computer readable medium storing a program causing a computer to execute a process for information processing, the process comprising:
acquiring a target image and a processing image from a memory, wherein
the target image and the processing image are separate images stored consecutively to one another in the memory without another image intervening between the target image and the processing image in the memory,
the target image is obtained by photographing a target, and
the processing image includes a pattern recognizable by the computer as an instruction for processing to be performed on the target image and the pattern is present when the processor acquires the processing image from the memory, and
performing the processing on the target image as a result of to acquiring the processing image from the memory and recognizing the pattern as the instruction, and without additional input.

* * * * *